United States Patent [19]

Onisawa et al.

[11] Patent Number: 5,106,553
[45] Date of Patent: Apr. 21, 1992

[54] METHOD FOR MOLDING A FORMATTED SUBSTRATE FOR AN OPTICAL DISK

[75] Inventors: Yoshio Onisawa; Yoshinobu Yukinaga, both of Hyogo, Japan

[73] Assignee: Daicel Chemical Industries, Ltd., Sakai, Japan

[21] Appl. No.: 339,264

[22] Filed: Apr. 17, 1989

[30] Foreign Application Priority Data

| | | | |
|---|---|---|---|
| Apr. 16, 1988 | [JP] | Japan | 63-94098 |
| Apr. 16, 1988 | [JP] | Japan | 63-94099 |
| Apr. 16, 1988 | [JP] | Japan | 63-94100 |

[51] Int. Cl.$^5$ ............................................. B29C 45/40
[52] U.S. Cl. ................................ 264/106; 264/328.1; 264/334; 425/556; 425/810
[58] Field of Search .......... 264/328.1, 334, 335, 264/106, 107; 425/556, 437, 810, 192 R, 185, 190; 249/103

[56] References Cited

U.S. PATENT DOCUMENTS

| | | | |
|---|---|---|---|
| 4,118,168 | 10/1978 | Rees et al. | 425/810 |
| 4,185,955 | 1/1980 | Holmes et al. | 264/106 |
| 4,340,353 | 7/1982 | Mayer | 264/335 |
| 4,573,900 | 3/1986 | Smith | 425/437 |
| 4,731,013 | 3/1988 | Schrammel | 425/810 |
| 4,737,096 | 4/1988 | Poorten | 425/810 |
| 4,755,128 | 7/1988 | Alexander et al. | 425/437 |
| 4,783,041 | 11/1988 | Sakaida et al. | 425/810 |
| 4,789,320 | 12/1988 | Sasamura et al. | 425/810 |
| 4,790,738 | 12/1988 | Shimojo et al. | 425/810 |
| 4,917,833 | 4/1990 | Cools | 264/106 |

*Primary Examiner*—Jill L. Heitbrink
*Attorney, Agent, or Firm*—Pennie & Edmonds

[57] ABSTRACT

Improvement in a method for molding a plastic substrate for an optical disk having a concave-convex pattern on a side surface thereof including a step of feeding liquid resin into a molding cavity defined by a pair of mold halves, characterized in that, when the molded plastic substrate is released from the mold halves, the molded plastic substrate is released at least simultaneously in time from both of the mold halves in a mold-opening stage.

1 Claim, 6 Drawing Sheets

METHOD FOR MOLDING A FORMATTED SUBSTRATE FOR AN OPTICAL DISK

BACKGROUND OF THE INVENTION

1. Field of the Invention

The present invention relates to method for injection-molding a plastic substrate in high-density information recording carriers or media such as an optical including ROM disks such as CD (compact disk), VD (video disk), DRAW disks, E-DRAW disks, optical cards or the like.

2. Description of the Related Art

The substrates used in high-density information recording carriers or media are generally made of glass, metal, ceramics or plastic materials. The plastic substrates are preferable because of their lightweight, high strength and high productivity.

The plastic substrate for optical disks is a thin flat plastic disks having a thickness of about 1.2 to 1.5 mm and an outer diameter of less than about 300 mm. Such thin flat disks are not easy to be produced by injection molding machines because resin materials such as acryl resins or polycarbonate resins of which the plastic substrates are made have very poor melt-flow properties or "flowability". In other words, it is very difficult to produce such a plastic substrate that satisfies two requirements in an optical property such as low birefringence and in a molding property such as high pattern-transferring property.

The high pattern-transferring property means such an ability that a surface replica patter, in other words, a concave-convex pits pattern on a surface of the stamper held on the mold is transferred precisely onto a plastic substrate molded, and is one of the most important factors that are required to produce plastic disks used for the above-mentioned type applications.

FIGS. 1 and 2 illustrate two typical structures of molds which are usually used in the conventional injection molding machines for producing the plastic substrate for optical disks.

The mold assembly shown in FIG. 1 has a pair of mold halves comprising a movable mold half 1 and a stationary mold half 2 which define a molding cavity 3. On one of the mold halves 1 and 2 (in the case shown in FIG. 1, on the movable mold half 1), a so-called stamper 4 is held by a stamper holder 5. The stamper 4 is a replica which is usually manufactured by a mastering machine. The stamper 4 or a replica has a concave-convex patterned surface which is composed of information pits and tracking grooves having dimensions of sub-micron order. On another mold half (in the case of FIG. 1, on the stationary mold half 2), an outer ring 6 is secured so that at a radially outer periphery of the molding cavity is defined by the outer ring 6. Molten resin is injected into the molding cavity 3 through a sprue 7.

FIG. 2 illustrates another type injection mold assembly. In FIG. 2, a dash (') is put to same reference numbers for members which correspond to FIG. 1. This type mold assembly which is called generally "inlay" type has no outer ring such as the ring 6 of FIG. 1 but has such a structure that an tapered inner side surface 10 of a stamper holder 5' will contact with a complementary surface 9 of the stationary mold half 2', so that an outer periphery of the molding cavity 3' is defined by the tapered side surface 10.

The stationary mold half 2 or 2' is secured to a stationary platen (not shown), while the movable mold half 1 or 1' is secured to a movable platen (not shown) of an injection molding machine.

In operation, after the mold halves 1 or 1' and 2 or 2' are mated to each other to close the molding cavity 3 or 3', molten resin is injected into the molding cavity 3 or 3' through the sprue 7 or 7'.

After a molded plastic disk is left to be cooled or solidified for a predetermined time duration, the mold is opened. In this mold-opening operation, the movable mold half is displaced or retracted from the stationary mold half by de-actuating a mold clamping mechanism (not shown) to open the mold halves. Then, air is blown through air injection holes arranged in the neighborhood of a center of the stationary mold half to release the molded plastic substrate from the stationary mold half at first. Therefore, in the initial stage of the mold-opening operation, the molded plastic substrate is held on or sticks to a surface of the stamper 4 which is supported on the movable mold half.

Then, after the mold halves are opened completely, air is blown through another air injection holes arranged in the neighborhood of a center of the movable mold half to release the molded plastic substrate from the stationary mold half secondly. Then, ejector rods (not shown) are actuated mechanically to eject the molded plastic substrate out of the mold.

The optical disks are classified into two categories of a pre-formatted type and a post-formatting type.

In the case of post-formatting type, only trucking guide grooves (continuous grooves) are engraved or molded on a surface of the plastic substrate. On the guide grooves of the plastic substrate, a recording layer is deposited in a next recording layer forming stage. Formatting signals are cut or recorded on the recording layer in a so-called formatting stage in an optical disk driving unit. Therefore, a problem to be solved in the process for molding plastic substrates used for such post-formatting type optical disks is how to transfer precisely the embossed concave-convex trucking grooves from the stamper onto the plastic substrate surface.

The pre-formatted type is apparently much economical than the post-formatting type because the formatting operation in the optical disk driving unit can be eliminated. In fact, in this case, both of format signals and trucking grooves must be engraved or molded simultaneously on the surface of the plastic substrate in the molding stage. Such pre-formatted type optical disks which are the main trend in the field of optical recording media can be realized by an ultra-fine molding process as well as the recent development in the mastering technique and in the optical disk driving unit. In the case of pre-formatted type optical disks, however, it arises still another problem, because the format signals consist of a series of concave-convex pits each having a predetermined length which must be transferred much precisely than the trucking groove each consisting of a simple spiral or continuous groove. Generally, such fine pre-format signal pits are cut or engraved on a surface of the stamper by means of the mastering machine.

When a plastic substrate is molded according to the conventional injection mold process in the conventional mold assembly in which the stamper having such pre-format signal pits on its side surface is held, it is often observed such a defect that the transferred pits have deformed or distorted configuration by a phenomenon of "flow of pits" towards the enter of the disk, in other words, each concave-convex pit is not transferred precisely from the stamper to the plastic substrate but is distorted or becomes "dull" on the plastic substrate obtained.

Such plastic substrate of which pre-format signal pits are "dull" or distorted can not be used for application of optical disks. In fact, a reflection light from a recording layer deposited on such deformed plastic substrate deviates from a predetermined intensity, resulting in that high performance in recording and play-back characteristics of the optical disk can not be obtained.

The present inventors found such a fact that the above-mentioned phenomenon of "flow of pits" occur just after the mold is opened but before the molded plastic substrate is separated completely from the stamper, and completed the present invention.

Therefore, an object of the present invention is to provide a method to overcome the problems in prior arts such as poor quality of the pit-transfer from the stamper to the plastic substrate caused by the phenomenon of "flow of pits" and also to provide an improved mold assembly used to realized the method according to the present invention.

SUMMARY OF THE INVENTION

The present invention provides a method for molding a plastic substrate for an optical disk having a concave-convex pattern on a side surface thereof including a step of feeding liquid resin into a molding cavity defined by a pair of mold halves, characterized in that, when the molded plastic substrate is released from the mold halves, the molded plastic substrate is released at least simultaneously in time from both of said mold halves in a mold-opening stage.

Generally, the method of the present invention is preferably carried out by injection molding process and the liquid resin is molten thermplastic resin.

More precisely, the present invention provides a method for molding a formatted substrate having format signals and/or guide grooves on its one side surface and being used for an optical disk by feeding liquid resin into a molding cavity defined by a pair of mold halves on one of which a stamper is held, characterized in that both of a side surface having format signals and/or guide grooves and an opposite side surface of the molded plastic substrate are released at least simultaneously in time from the respective mold halves in the mold-opening stage when a molded substrate is released from the mold halves after the liquid resin is cooled and solidified.

In a preferred embodiment, the molded plastic substrate is released firstly from the movable mold half in the start of the mold-opening stage, namely, the release of the side surface having the format signals and/or guide grooves of the molded plastic substrate from the stamper precede the release of the opposite side surface of the molded plastic substrate from a corresponding molding surface.

Preferably, the release from the mold halves is effected by air blow fed into an interface between the molded plastic substrate and the molding surfaces. The present invention is advantageously applicable to a formatted plastic substrate having format signals and/or trucking guide grooves transferred from the stamper onto its one side surface.

The method according to the present invention can be carried out by adjusting timing of air-blow in the conventional mold assembly.

In a simplest embodiment of the present invention, the method is effeced in the conventional mold assembly in which the stamper is supported on the stationary mold half.

In the simplest embodiment of the mold assembly according to the present invention, the mold assembly used for molding a plastic substrate of an optical disk including a pair of mold halves comprising a movable mold half and a stationary mold half, one of the mold halves having a mirror surface, and a stamper supported on a surface of another mold half and having information pits to be transferred onto the plastic substrate is characterized in that the stamper is supported on the stationary mold half.

In a preferred embodiment of the present invention, the method according to the present invention is effected by means of an improved mold assembly.

In the preferred embodiment of the mold assembly according to the present invention, the mold assembly used for molding a plastic substrate of an optical disk, including a pair of mold halves having a pair of inner surfaces each facing to each other, one of said paired inner surfaces being a mirror surface, while another inner surface has a concave-convex pattern of information pits which are transferred to a surface of the plastic substrate to be molded, and an outer ring secured to one of said mold halves at an outer periphery thereof and having a tapered radially inner surface which divergents towards a direction along which the molded plastic substrate is ejected, wherein a molding cavity is defined by said inner surfaces and the tapered surface of said outer ring, characterized in that the outer ring is slidably supported in the movable mold half.

The outer ring preferably forms a part of a female mold to define an inlay type mold assembly. The stamper preferably is supported by the outer ring and the outer ring preferably has bent holes.

DESCRIPTION OF THE PREFERRED EMBODIMENTS

At first, a phenomenon observed in the conventional injection process for molding a plastic substrate for optical disks will be explained.

When molten resin injected in a molding cavity start to be cooled, the resin start to shrink gradually towards the center of the disk. This shrinkage, however, is not allowed during the mold halves are closed tightly because of the clamping force exerted to the mold halves and because of friction force between the resin and the molding surfaces.

Then, when the mold clamping force is released to open the mold halves, a flat side surface of the molded plastic disk which is opposite to the format signal side surface is released or separated at first from the molding surface, while the format signal side sticks intimately to the stamper. In this stage, the shrinkage of resin start on the flat side surface but is restricted since the format signal side sticks intimately to the stamper, in other words, is intimately held by the stamper owing to friction between the format signal side surface of the plastic disk and the stamper surface, so that the resin in the plastic disk is biased or pulled to a balanced point where the shrinkage which is stronger than the friction match with the frictional force.

Thus, the phenomenon of "flow of pits" is an evidence or marks left on a surface of the molded plastic substrate transferred from a pit pattern of the stamper caused by the difference in shrinkage between the stamper and the plastic disk, and hence is influenced by the height of the pit. In fact, the height of the pit becomes higher, the pit flows much longer.

The present inventor thought that the trouble of the "flow of pits" can be eliminated if the signal side surface is released at least simultaneously, more preferably earlier than the opposite side surface. The present invention is based on such idea.

Figure 1:
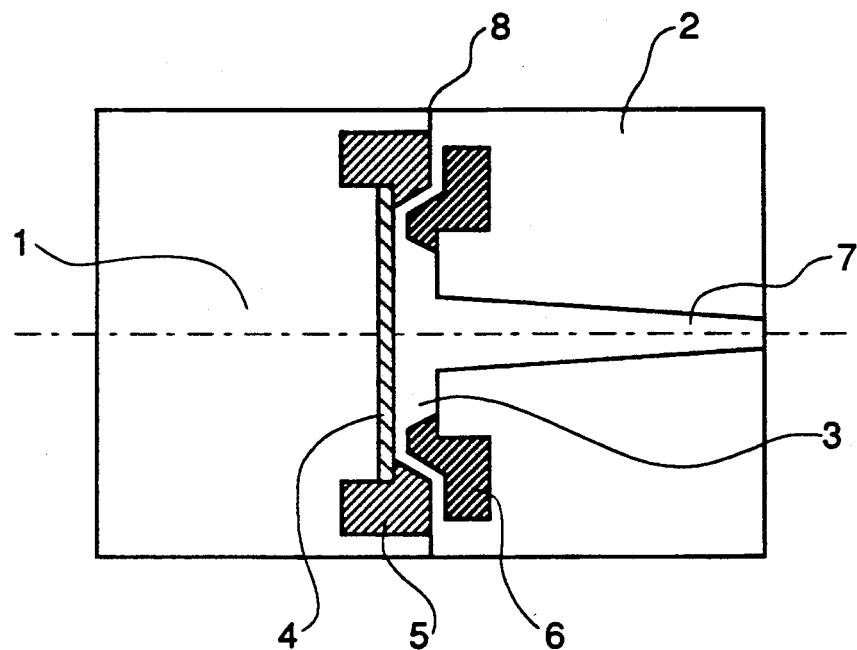
FIGS. 1 and 2 illustrate diagrammatical cross sectional views of two mold assemblies used in injection molding process for producing plastic substrates of optical disks in prior arts.
Figure 2:
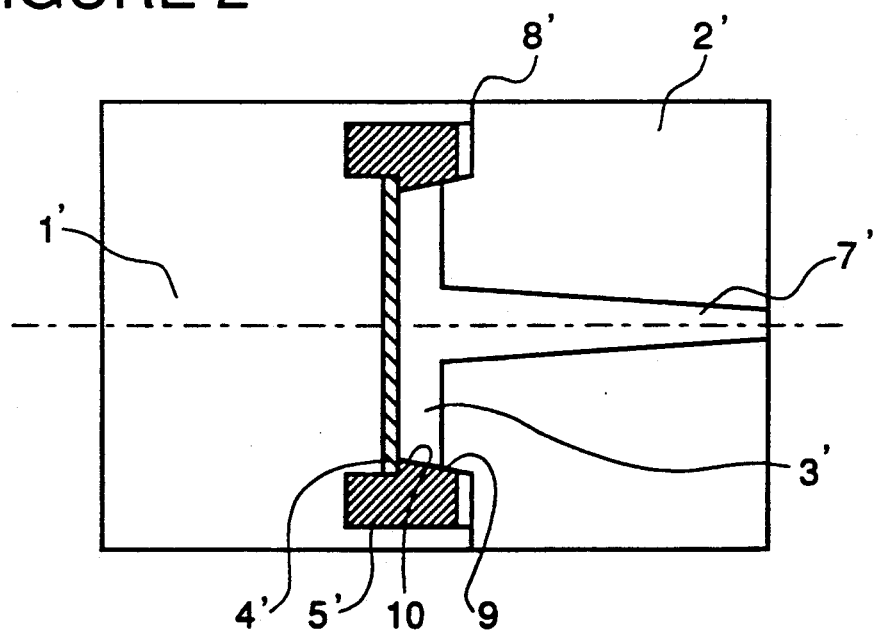

The method according to the present invention can be carried out even in the conventional molds such as shown in FIGS. 1 and 2.

According to a first embodiment of the present invention, the timing of air-blow which is fed through the air-blow ejectors arranged in the neighborhood of the center of the stationary mold half and of the movable mold half respectively at the mold opening stage is adjusted in such a manner that the molded plastic substrate is released at least simultaneously at the stamper side and at the opposite surface, more preferably the release from the stamper precede the release from the opposite side.

Namely, in this first embodiment, the method of the present invention is effected at the beginning of the mold-opening stage for removing the molded disk out of the mold. More precisely, after the resin is injected into the molding cavity and is left to be cooled and solified for a predetermined time duration, at a moment when the mold halves start to open, the timing of air-blown is adjusted in such a manner that air is blown at least simultaneously at the stamper side and at the opposite surface so that the molded substrate is released at least simultaneously at both side surfaces, or more preferably, that air is blown firstly at the stamper side and then at the opposite side so that molded plastic substrate is released firstly at the stamper side and then is released at the opposite side. Then, the molded plastic substrate is ejected by a mechanical ejector ring or rods in order to clear the molded plastic substrate completely out of the mold.

Generally this method of the present invention can be carried out in the conventional injection mold with liquid resin such as molten thermoplastic resin. The present invention is also applicable to the other molding process such as compression molding, casting or the like.

The concave-convex pattern is engraved in a stamper supported on one of the mold halves. The stamper having the concave-convex pattern is usually a replica of trucking guide grooves and/or pre-formatted signal pits having sub-micron orders.

The release of the molded disk from the mold is preferably effected by air-blow supplied into an interface between the molded disk and the molding surface. In a variation, the air-blow ejector of the stationary mold half is not actuated before a clearance between the two mold halves becomes to a predetermined distance such as several ten microns ($\mu m$) at the beginning of the mold-opening stage and then the air-blow ejector of the stationary mold half is actuated.

This solution that the timing of air-blow which is fed through the air-blow ejectors arranged in the neighborhood of the center of the stationary mold half and of the movable mold half respectively at the mold opening stage is adjusted in such a manner that the molded plastic substrate is released firstly or earlier from the stamper side than from the opposite surface, in other words, the release from the stamper precede the release from the opposite side itself is satisfactory but has a trouble in next handling stage. In fact, in the above-mentioned case, the molded plastic disk remained or supported on the side of the stationary mold half until the final stage of product removal from the mold, because it is difficult to remove the molded plastic disk remained or supported on the side of the stationary mold half out of the mold by an automated handling machine or a robot for taking the disks out of the mold.

Therefore, in another embodiment according to the present invention which can be effected by simple modification of the conventional mold assembly, the above-mentioned conventional problem of the "flow of pits" in the prior arts can be eliminated by such a simple method that the stamper is supported not by the movable mold half but by the stationary mold half. This solution has another an industrially very important advantage that the automated handling of the molded disks for taking the disks out of the mold can be assured with no substantial change of the conventional molding assembly.

The present invention also provides an improved mold assembly used for realizing the method according to the present invention.

The improved mold assembly used for molding a plastic substrate of an optical disk, including a pair of mold halves having a pair of inner surfaces each facing to each other, a ring secure to one of said mold halves at an outer periphery thereof, a molding cavity being defined by said inner surfaces and an inner surface of said ring, one of the paired inner surfaces being a mirror surface, while another inner surface has a concave-convex pattern of information pits which are transferred to a surface of the plastic substrate to be molded, the inner surface of the ring having a tapered surface which divergent towards a direction along which the molded plastic substrate is ejected is characterized in that the ring is slidably supported in the mold half.

The tapered radially inner surface of the defines an outer periphery of the inlay type molding cavity above-mentioned. The stamper is preferably supported by an female mold part constructed by the ring. The ring has preferably vent holes.

The method according to the present invention permit to eliminate the phenomenon of the "flow of pits" and also has the following advantages:

(1) The trucking groove becomes to a true circle or a true spiral, in other words, is not distorted since the signal side surface shrink uniformly all over the disk surface because the molded plastic disk is released just after the mold halves start to be separated from each other.

(2) A defect of so-called "cloud mark" in the plastic disks which is often observe in CD (compact disk) and which is caused by entrapped gas can be eliminated because the molded plastic disk is released immediately after the mold is opened.

(3) When the present invention is applied to an injection-compression molding process which itself is known, compressive stress exerted by the mold onto the plastic substrate can be distributed much uniformly all over the plastic disk, so that deformation of the resulting plastic substrate molded can be reduced.

In the simple method in which the stamper is supported not by the movable mold half but by the stationary mold half, the present invention has another an industrially very important advantage that the automated handling of the molded disks at the disk removal stage out of the mold can be effected with no substantial change of the conventional molding assembly and easily by an automated handling machine or a robot.

Now, embodiments and examples of the present invention will be described with reference to the attached drawings, but the present invention is not limited to the example.

EXAMPLE 1

In Example 1, the method according to the present invention is effected by adjusting the air-blow timing.

A stamper on which a pit pattern consisting trucking grooves and format signals pits each having a depth of 800 Å is engraved is held on a molding surface of an inlay type injection mold assembly shown in FIG. 2. The mold assembly is installed in an injection molding machine (MEIKI Seisakusho, M-70). A plastic disk substrate having a diameter of 200 mm and a thickness of 1.2 mm is molded in the injection molding machine with commercially available polycarbonate resin at a cylinder temperature of 330° C. and a mold temperature of 110° C.

In this Example 1, air is blown through both air-blown holes arranged in a stationary mold half and in a movable mold half respectively substantially simultaneously in response to a mold-opening signal, so that the molded plastic disk is released substantially simultaneously both mold halves.

Figure 9:
FIG. 9 is an electron microscopy of a molded plastic substrate obtained according to the method of the present invention.

FIG. 9 is an electron microscopy of the molded plastic substrate obtained. It is apparent from this figure that this molded disk shows no "flow of pits".

COMPARATIVE EXAMPLE 1

Another plastic disk substrate is molded in the same mold assembly and same injection molding machine and by the same injection condition as Example 1 except that the molded disk substrate is released firstly from the stationary mold half according to the conventional manner.

Namely, in this comparative example, air is blown only through air-blow ejector holes arranged in the neighborhood of the center of the stationary mold half in response to a mold-opening signal, so that the molded plastic disk is released from the stationary mold half at first. Then, after the mold halves are opened completely, air is blown through air-blown ejector holes arranged in the neighborhood of the center of the movable mold half, so that the molded plastic disk is released from the stamper held on the movable mold half. The molded disk is ejected finally by a mechanical ejector out of the mold.

In this comparative example, the molded plastic disk continues to stick to the stamper until the clearance between the mold halves becomes large.

Figure 10:
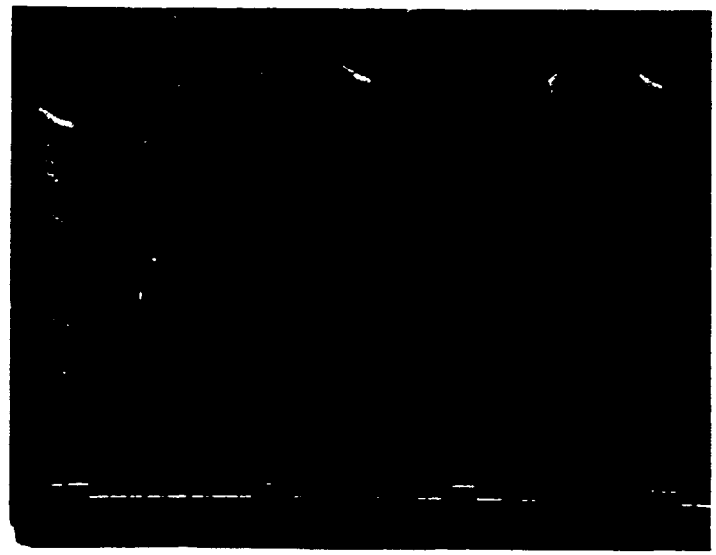
FIG. 10 is a copy of an electron microscopy of a molded plastic substrate obtained according to the conventional process.

FIG. 10 is an electron microscopy of the molded plastic substrate obtained. It is apparent from this figure that this molded disk shows "flow of pits".

EXAMPLE 2

Another simple embodiment of the present invention applied to an inlay type injection mold which is itself known will be described with reference to FIG. 3.

Figure 3:
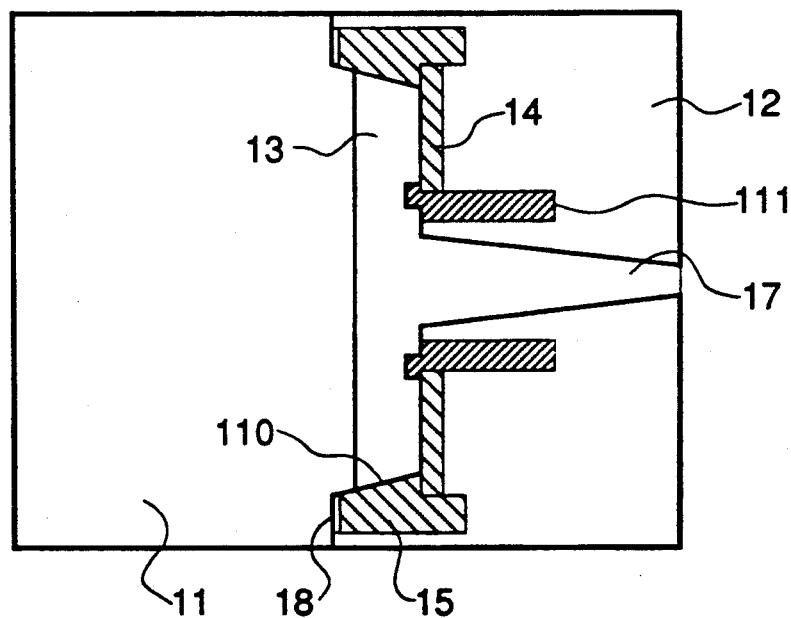
FIG. 3 illustrates a diagrammatical cross sectional view of a mold assembly used in an injection molding process for producing plastic substrates of optical disks by a simple modification of the conventional mold assembly.

The mold assembly shown in FIG. 3 comprises a movable mold half 11, a stationary mold half 12, a stamper 14 having a concave-convex patterned surface of trucking guide grooves and/or format signal pits, an outer ring 15 supported on the movable mold half and having a tapered inner side surface 110, a molding cavity 13 being defined by an inner surface of the stamper 14, a surface of the stationary mold half 12 and the tapered inner periphery 110 of the outer ring 15. 111 denotes a central stamper holder which supports the stamper 14 at the center of the mold. The mold halves 11 and 12 are secured respectively to a movable mold platen and a stationary mold platen (not shown) of the injection molding machine.

In operation, after the mold halves 11 and 12 are mated to each other to close the molding cavity 13, molten resin is injected into the molding cavity 13 through a sprue 17. After molded plastic disk is cooled to be solidified for a predetermined time duration, the mold is opened.

In this mold-opening operation, the movable mold half 11 is separated from the stationary mold half 12 by de-actuating a mold clamping mechanism to open the mold halves. Then, air is blown through air injection holes (not shown) arranged in the neighborhood a center of the stationary mold half 12, so that the molded plastic substrate is released or separated firstly from the stationary mold half 12 and hence from the stamper 14.

Then, after the mold is opened completely, the molded plastic substrate is ejected by ejector rods from the stationary mold half 12. A sprue part integrated with the molded disk is cut from the disk part in next sprue-cutting stage.

Following is a preferred example of the process according to the Example 2.

A stamper on which a pit pattern consisting trucking grooves each having a depth of 800 Å and format signals pits each having a height of 1,600 Å is engraved is held on a molding surface of an inlay type injection mold assembly shown in FIG. 3. The mold assembly is installed in an injection molding machine (MEIKEI Seisakusho, M-70). A plastic disk substrate having a diameter of 200 mm and a thickness of 1.2 mm is molded in the injection molding machine with commercially available polycarbonate resin at a cylinder temperature of 330° C. and a mold temperature of 110° C.

In this Example 2, the molded plastic disk is released firstly from the stationary mold half 12 and hence from the stamper 14 and is released finally from the movable mold half 11 after the mold halves 11 and 12 are opened completely.

Observation by an electron microscopy revealed that the molded plastic substrate obtained shows neither defect of "flow of pits" nor trouble of removal out of the molded disks out of the mold was observed even after the molding operations were repeated for thounsand times (1,000 shots).

Figure 4:
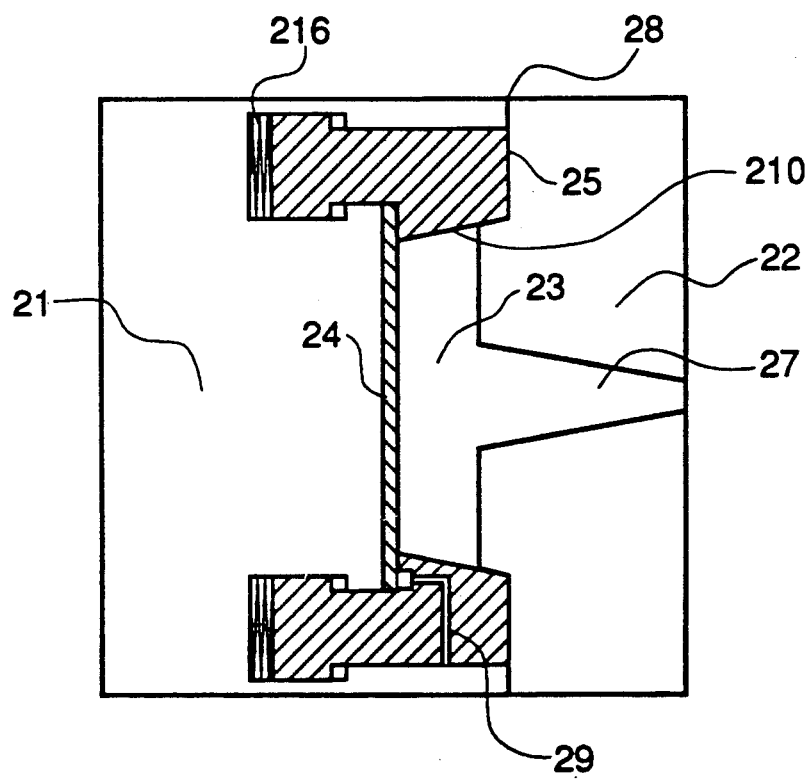
FIG. 4 illustrates a diagrammatical cross sectional view of a mold assembly used in injection molding process for producing plastic substrates of optical disks according to a preferred embodiment of the present invention.

EXAMPLE 3:

In this example 3, an improved mold assembly shown in FIG. 4 which illustrate a cross sectional view of a preferred embodiment of a mold assembly according to the present invention is used.

The mold assembly shown in FIG. 4 comprises a movable mold half 21, a stationary mold half 22, a stamper 24 having a concave-convex patterned surface of trucking guide grooves and/or format signal pits, an outer ring 25 supported slidably in the movable mold half and having a tapered inner side surface 210, a molding cavity 23 being defined by the stamper surface 24, a surface of the stationary mold half 22 and the tapered inner periphery 210 of the outer ring and a spring 216 which biases the outer ring 25 to a direction of mold opening. A sprue 27 passes through the stationary mold half 22, The movable mold halves 21, 22 contact each other at a partin line 28. The outer ring 25 has a vent hole 29 through which entrapped gas in the cavity 23 can escape.

Now, the operations of the mold assembly will be described with reference to FIGS. 5 to 8.

Figure 5:
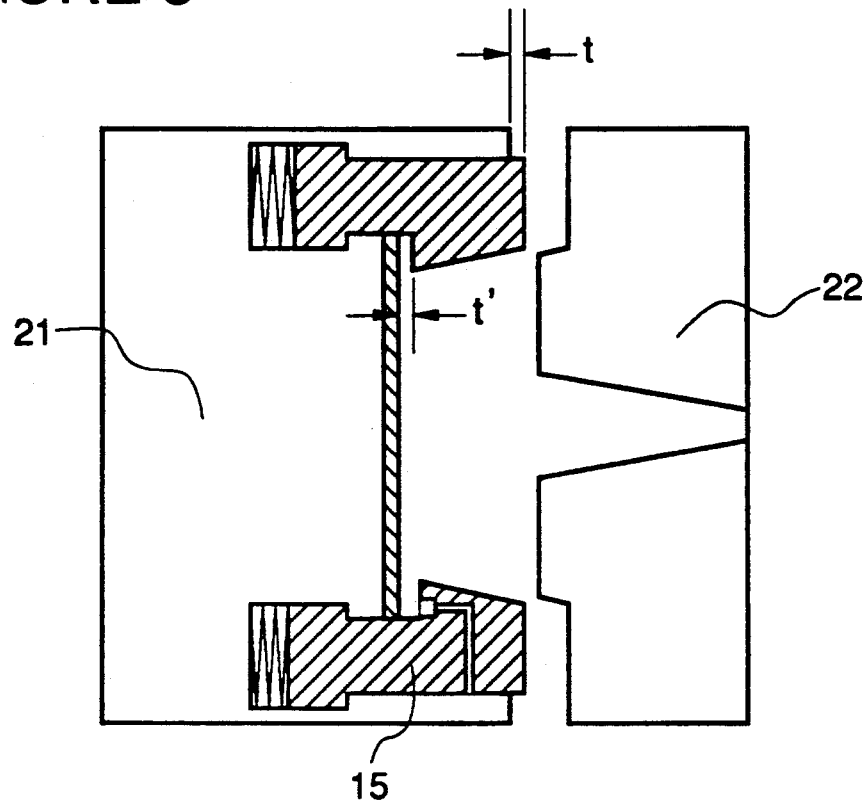
FIGS. 5 to 8 are illustrative views which show successive stages of the preferred embodiment shown in FIG. 4.

FIG. 5 illustrates a condition when the movable mold half 21 and the stationary mold half 22 which are secured to respective mold platens are opened. In this condition, the outer ring 25 is biased towards the stationary mold half 22 by the spring 216 to be displaced in a distance of "t" from the parting line 28. This distance "t" is selected to in such a manner that the distance "t" becomes larger by 0 to 45 μm, ideally from 5 to 20 μm than a clearance "t'" which will be created between an inner surface of the stamper 24 and an axial contact surface of the outer ring 25.

Figure 6:
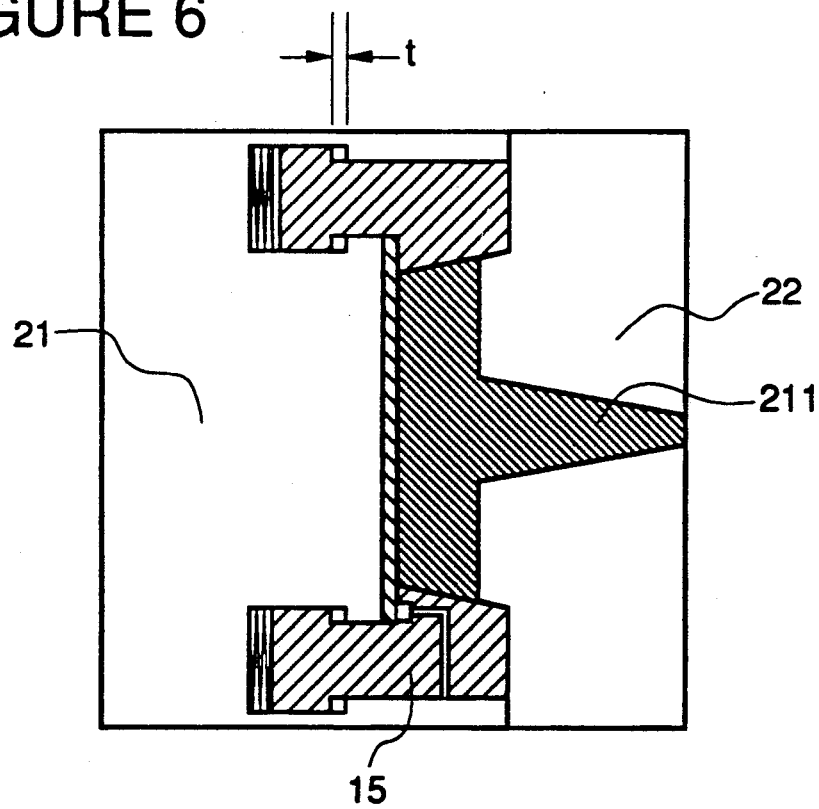

Then, after the mold halves 21, 22 are closed, molten resin 211 is injected into the molding cavity 23 (FIG. 6). In this stage, a front surface of the outer ring 25 contacts with the stationary mold half 22, so that the outer ring is forced into the movable mold half 21 and withdrawn therein in a distance corresponds to the distance "t".

Figure 7:
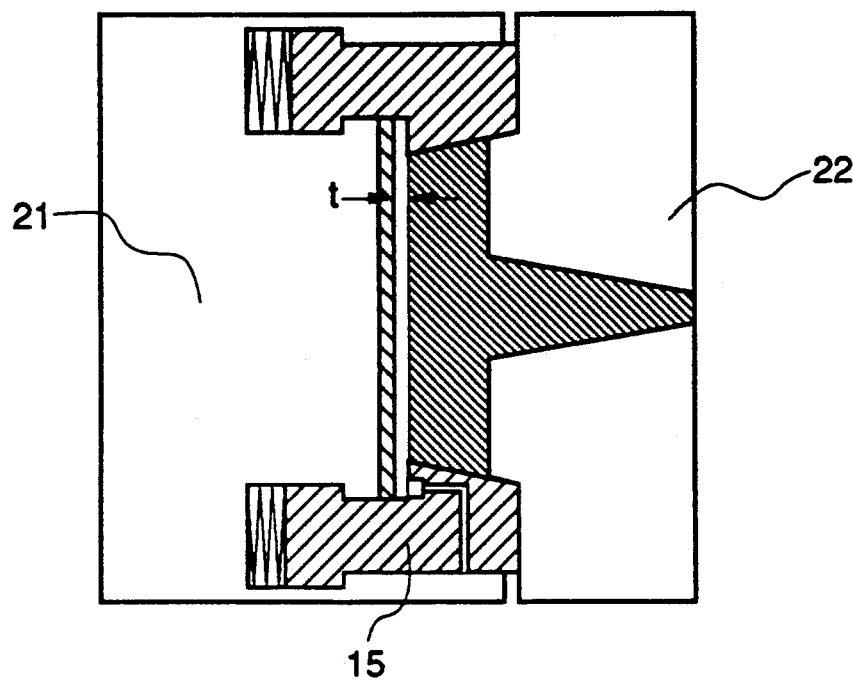
Figure 8:
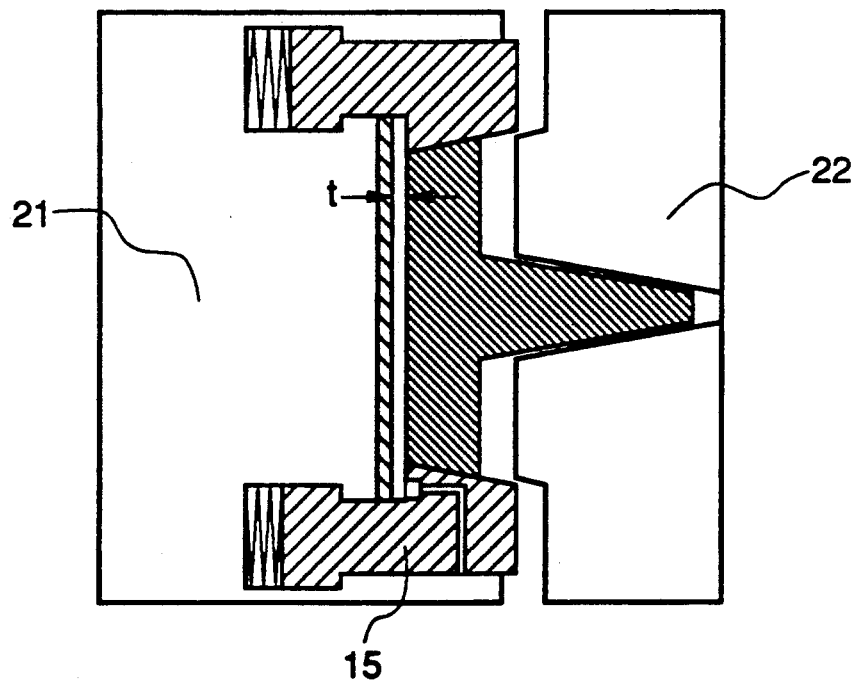

FIG. 7 illustrates an initial stage of the mold-opening operation which is effected in order to remove the molded plastic disk out of the mold after the molten resin 210 in the molding cavity is cooled and solidified.

During this stage, the outer ring 25 is pushed outwards by the spring 216, while air is also blown through air-blow injecting holes (not shown) arranged in the neigborhood of the center of the movable mold half 21 in order to facilitate the release of the molded plastic disk from the stamper, so that the molded plastic disk 211 which is supported by the tapered inner periphery of the outer ring 25 is forced to be separated from the stamper 24, because the tapered inner surface 210 is divergent towards a direction along which the molded plastic substrate is ejected.

Then, the molded plastic disk 211 supported on the tappered inner periphery of the outer ring 25 and stuck to the stationary mold half 22 is released from the stationary mold half 22 by supplying air blown through air-blow injecting holes (not shown) arranged in the neighborhood of the center of the stationary mold half 22, so that the molded disk is supported by the outer ring 25 alone and is released from both mold halves.

Finally, after the mold halves 21, 22 are opened completely, the molded disk is ejected out of the mold by mechanical ejector ring or rods.

The air-blow through the stationary mold half may be initiated substantially at the same time as the air-blow through the movable mold half, provided that the molded plastic disk is released firstly from the stamper surface. Preferably, the air through the stationary mold half is not fed in the initial stage of mold-opening operation shown in FIG. 7, but is blown after a moment when the clearance or distance "t" is created between the mold halves 21 and 22. In this case, the molded disk is remained in a supported position held by the outer ring 25 even if compressed air is blown into an interface between the stamper and the molded disk, since the air can escape through the vent holes 29.

Observation by an electron microscopy revealed that the molded plastic substrate obtained shows no defect of "flow or pits".

We claim:

1. A method for molding a plastic substrate for a high-density information recording optical disk having a concave-convex pattern of format signal and/or trucking grooves on a side surface thereof by injecting molten resin into a molding cavity defined by a pair of mold halves, a stamper being supported on a surface of one of the mold halves, characterized in that, when the molded plastic substrate is released from the mold halves the molded plastic substrate is released at a mold-opening stage, firstly in time from a side surface onto which said concave-convex pattern is transferred from a surface of said stamper and then is released from a mirror surface of opposite mold halves.

* * * * *